(12) United States Patent
Ito

(10) Patent No.: US 6,776,389 B2
(45) Date of Patent: Aug. 17, 2004

(54) FEEDBACK MECHANISM AND VALVE POSITIONER

(75) Inventor: Kofuku Ito, Tokyo (JP)

(73) Assignee: Yamatake Corporation, Tokyo (JP)

( * ) Notice: Subject to any disclaimer, the term of this patent is extended or adjusted under 35 U.S.C. 154(b) by 37 days.

(21) Appl. No.: 10/365,149

(22) Filed: Feb. 12, 2003

(65) Prior Publication Data

US 2003/0155542 A1 Aug. 21, 2003

(30) Foreign Application Priority Data

Feb. 13, 2002 (JP) ........................................ 2002-035048

(51) Int. Cl.[7] ........................... F16K 31/02; F16K 51/00
(52) U.S. Cl. ................................................. 251/129.04
(58) Field of Search ........................ 251/129.01–129.22

(56) References Cited

U.S. PATENT DOCUMENTS 5,590,677 A * 1/1997 Kuroda ......................... 137/85
6,363,895 B1 * 4/2002 Butzmann et al. ........ 123/90.11
6,371,064 B2 * 4/2002 Hartke et al. ............. 123/90.11
6,543,477 B2 * 4/2003 Bauer et al. ................. 137/554

FOREIGN PATENT DOCUMENTS

JP          04-185902 A      7/1992
JP          11-125201 A      5/1999

* cited by examiner

Primary Examiner—Paul J. Hirsch
(74) Attorney, Agent, or Firm—Blakely Sokoloff Taylor & Zafman LLP

(57) ABSTRACT

A feedback mechanism includes a feedback pin, feedback shaft, feedback sensor, and connecting member. The feedback pin displaces interlocked with a motion of an actuating shaft of a valve that opens and closes. The feedback shaft pivots interlocked with displacement of the feedback pin. The feedback sensor outputs a feedback signal, to be used for opening/closing the valve, in accordance with a pivoting amount of the feedback shaft. The connecting member connects the feedback pin and the feedback shaft, and has a cylindrical first bearing through which the feedback pin is inserted, and a cylindrical second bearing through which feedback shaft is inserted.

6 Claims, 6 Drawing Sheets

FEEDBACK MECHANISM AND VALVE POSITIONER

BACKGROUND OF THE INVENTION

The present invention relates to a feedback mechanism and a valve positioner having the feedback mechanism.

Generally, as shown in Japanese Patent Laid-Open No. 4-185902 (reference 1), a conventional valve positioner has an electrical/pneumatic signal converter for converting an input signal (electrical signal) into a pneumatic signal, an amplifier for amplifying the converted pneumatic signal and outputting it as an output pneumatic pressure to an operation unit for a valve, and a feedback mechanism for converting the actual working amount of the valve and outputting a feedback signal. The valve is driven to control such that the difference between the feedback signal and input signal becomes zero.

As another conventional feedback mechanism, one disclosed in Japanese Patent Laid-Open No. 11-125201 (reference 2) is known. As shown in FIG. 8, in the feedback mechanism disclosed in reference 2, a slot 13 is formed in a feedback lever 9 formed of a metal plate, and a connecting pin (feedback pin) 12 projecting on an actuating shaft 4 of the valve is inserted in the slot 13 to be movable in the longitudinal direction of the slot 13. When the connecting pin 12 is urged by a pin pressing spring 14 against one side wall 13a of the slot 13, it is prevented from loosely moving perpendicularly to the longitudinal direction of the slot 13.

In the feedback mechanism of the conventional valve positioner described above, when the actuating shaft 4 of the valve vibrates due to the influence of the fluid flowing in the valve main body, the force caused by the vibration is received by a contact portion A of the connecting pin 12 and feedback lever 9 and a contact portion B of the connecting pin 12 and pin pressing spring 14. Generally, when controlling the opening of the valve, the valve is often controlled to maintain a predetermined angle. Thus, the connecting pin 12, feedback lever 9, and pin pressing spring 14 keep in contact with each other at substantially the same points (contact portions A and B), and the force caused by the vibration concentratedly acts on only the contact portions A and B. As a result, the contact portions A and B may wear or be damaged.

If the connecting pin 12 wears, the diameter of the connecting pin 12 itself reduces to enlarge the gap with respect to the slot 13, and the actual working amount of the actuating shaft 4 cannot be detected at high precision. In the worst case, as the strength decreases, the connecting pin 12 may be damaged. If the feedback lever 9 wears, a recess is formed on that portion of the side wall 13a of the slot 13 with which the connecting pin 12 is in contact. When the connecting pin 12 enters the recess, the actuating shaft 4 and feedback lever 9 cannot operate smoothly. Accordingly, in this case as well, the actual working amount of the actuating shaft 4 cannot be detected at high precision. Also, when the strength decreases due to the wear, the feedback lever 9 itself may be damaged.

If the pin pressing spring 14 wears, it may be damaged in the same manner as the connecting pin 12 and feedback lever 9.

Therefore, the components must be inspected every predetermined period of time or when necessary, and components that have worn out must be exchanged, leading to cumbersome exchange operation. In the exchange operation, the plant and process related to the valve as the exchange target must be temporarily stopped.

SUMMARY OF THE INVENTION

It is an object of the present invention to provide a feedback mechanism and valve positioner in which wear and damage of the components are prevented to improve the reliability and to prolong the service life.

In order to achieve the above object, according to the present invention, there is provided a feedback mechanism comprising a feedback pin which displaces interlocked with a motion of a driving shaft of a valve that opens and closes, a feedback shaft which pivots interlocked with displacement of the feedback pin, a feedback sensor which outputs a feedback signal, to be used for opening/closing the valve, in accordance with a pivoting amount of the feedback shaft, and a connecting member which connects the feedback pin and feedback shaft, the connecting member having a cylindrical first bearing through which the feedback pin is inserted and a cylindrical second bearing through which the feedback shaft is inserted.

DESCRIPTION OF THE PREFERRED EMBODIMENTS

The present invention will be described in detail with reference to the accompanying drawings.

Figure 1:
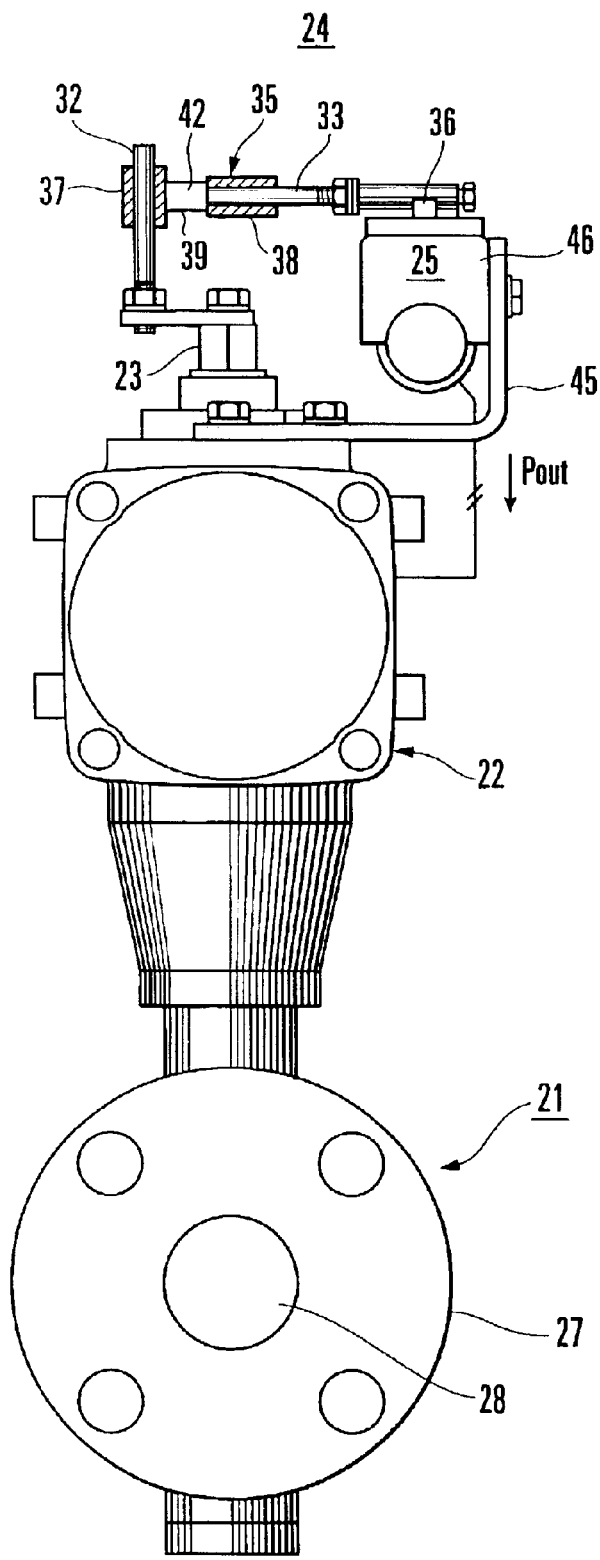
FIG. 1 is a front view of a valve system according to the first embodiment of the present invention.

FIGS. 1 to 4 show a valve system according to the first embodiment of the present invention. As shown in FIG. 1, the valve system according to this embodiment has a valve 21 which opens/closes, an operation unit 22 having an actuating shaft 23 to open/close the valve 21, a feedback mechanism 24 for performing feedback for valve control on the basis of the working amount of the actuating shaft 23, and a valve positioner 25 for opening/closing the valve 21 through the operation unit 22. The actuating shaft 23 is connected to the driving shaft (not shown) of the valve 21.

When the actuating shaft 23 is rotated at a maximum angle $\theta$ (e.g., $\theta=90°$) by the operation unit 22, the valve 21 comprised of a ball valve opens or closes a path 28 in a valve main body 27 with a ball having an opening through which a fluid can flow. The operation unit 22 of the valve 21 is actuated by a pneumatic signal Pout from the valve positioner 25, and drives the actuating shaft 23.

The feedback mechanism 24 converts the detected actual working amount of the actuating shaft 23 into an electrical signal, and feeds it back to the valve positioner 25. As shown in FIG. 4, the feedback mechanism 24 has an attaching plate 31 fixed to one end of the actuating shaft 23 with a bolt 30 to be perpendicular to the actuating shaft 23, a feedback pin 32 provided upright on the distal end of the attaching plate 31, a feedback shaft 33 connected to the feedback pin 32 and pivotally interlocked with the pivot motion (in the direction of an arrow B of FIG. 3) of the feedback pin 32, a rotary feedback sensor 34 (FIG. 2) for detecting the rotation angle of a rotary shaft 36 which pivots together with the feedback shaft 33 and converting it into an electrical signal corresponding to the rotation angle, and a connecting member 35 for connecting the feedback pin 32 and feedback shaft 33.

Figure 2:
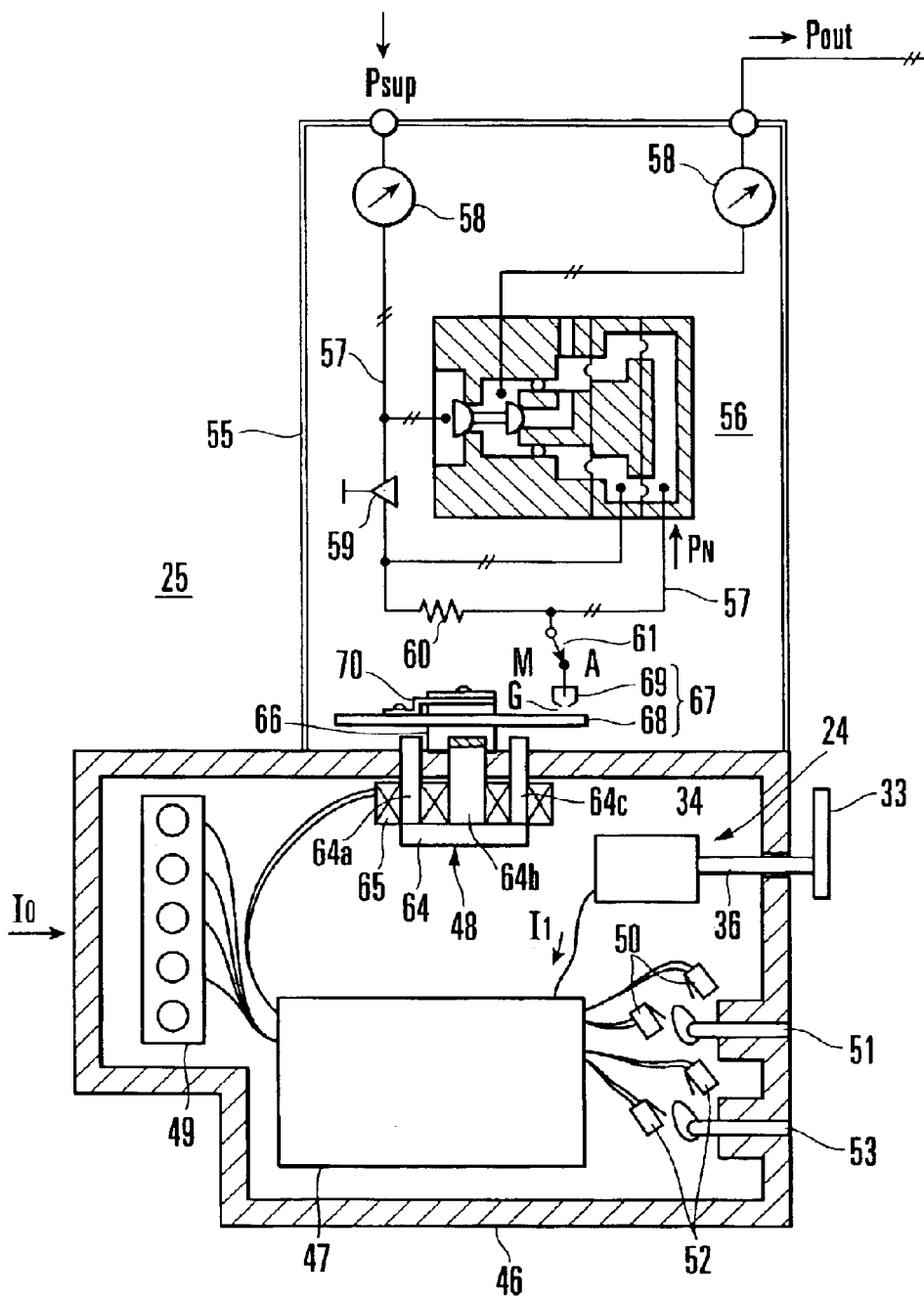
FIG. 2 is a schematic view showing the arrangement of the valve positioner shown in FIG. 1.
Figure 3:
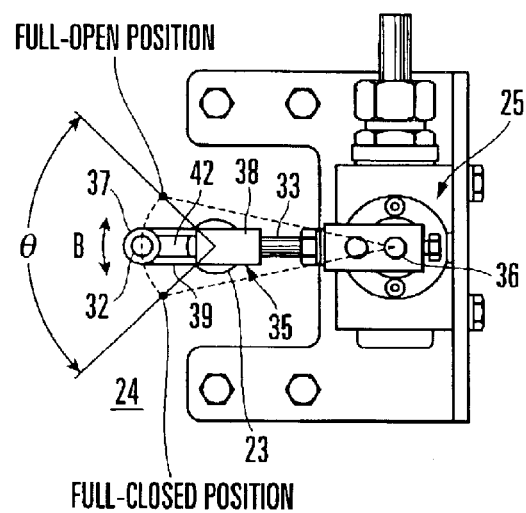
FIG. 3 is a plain view of the feedback mechanism shown in FIG. 1.
Figure 4:
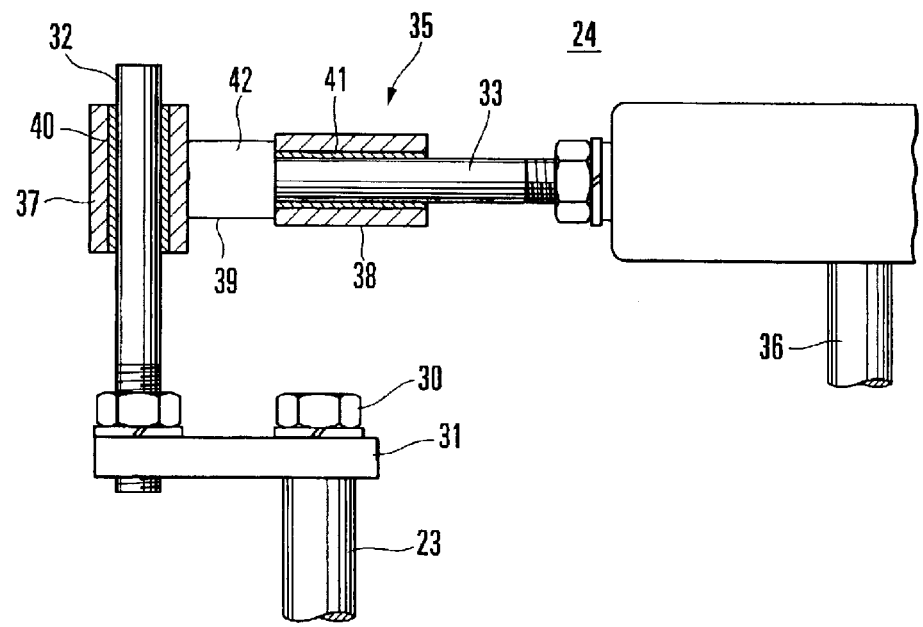
FIG. 4 is a sectional view of the main part of the feedback mechanism shown in FIG. 3.

The feedback shaft 33 is disposed to be perpendicular to the feedback pin 32, and is associated with the feedback sensor 34 so as to pivot in the direction of arrow B of FIG. 3 about the rotary shaft 36 as the center. As shown in FIG. 2, the feedback sensor 34 is housed in the valve positioner 25, and the feedback shaft 33 is disposed outside the valve positioner 25.

The connecting member 35 is comprised of a first bearing 37 through which the distal end of the feedback pin 32 is inserted rotatably, a second bearing 38 through which the distal end of the feedback shaft 33 is inserted to be slidable in the axial direction, and a connector 39 for connecting the first and second bearings 37 and 38. The first and second bearings 37 and 38 form cylinders each with two open ends, and oilless bearings 40 and 41 are inserted and fitted in them respectively. The openings at the two ends of each of the first and second bearings 37 and 38 are tapered so that the oilless bearings 40 and 41 can be inserted and fitted in them easily. As shown in FIG. 3, the connector 39 has a space 42 through which whether the distal end of the feedback shaft 33 projects from the second bearing 38 can be visually checked. The distal ends of the feedback pin 32 and feedback shaft 33 preferably substantially project from the first and second bearings 37 and 38, respectively, to increase the contact area and to disperse the force caused by the vibration.

As shown in FIG. 2, the valve positioner 25 has a machine main body 46 fixed to the operation unit 22 through an attaching plate 45 (FIG. 1), and a case 55 fixed to the machine main body 46. The machine main body 46 incorporates a control arithmetic unit 47, part of the feedback mechanism 24, part of an electrical/pneumatic signal converter 48, a terminal block 49, span adjusting switches 50, a span adjusting screw 51, zero adjusting switches 52, a zero adjusting screw 53, and the like. The case 55 incorporates a pilot relay 56, pipe 57, pressure gauge 58, pressure reducing valve 59, constriction 60, selector switch 61 for performing selection between manual operation and automatic operation, and the like.

The machine main body 46 is formed of an explosion-proof case made of a weak-magnetic or nonmagnetic material. The rotary shaft 36 of the feedback mechanism 24 projects outside the machine main body 46. This embodiment exemplifies the explosion-proof valve positioner 25. If the valve positioner 25 is not explosion-proof, the machine main body 46 may be formed integrally with the case 55 to form one non-explosion-proof machine main body, and the constituent components in the case 55 may also be housed in the machine main body.

The control arithmetic unit 47 is electrically connected to the feedback sensor 34, electrical/pneumatic signal converter 48, terminal block 49, span adjusting switches 50, and zero adjusting switches 52.

The E-shaped electrical/pneumatic signal converter 48 is constituted by a yoke 64 having three legs 64a, 64b, and 64c, an excitation coil 65 and permanent magnet 66 attached to the yoke 64, and a nozzle flapper mechanism 67 for converting the current supplied to the excitation coil 65 into a pneumatic signal.

The yoke 64 is formed simultaneously with the machine main body 46 by insert molding or the like, so that the distal ends of its three legs 64a, 64b, and 64c project outside the machine main body 46. The permanent magnet 66 is fixed to the distal end face of the central leg 64b with its N pole facing up and S pole facing down. The excitation coil 65 is mounted on the left and right legs 64a and 64b, and is excited by an input signal $I_0$.

The nozzle flapper mechanism 67 is formed of a flapper 68 arranged outside the machine main body 46 to oppose the distal end faces of the legs 64a, 64b, and 64c of the yoke 64, and a nozzle 69 arranged close to one end of the flapper 68 to oppose it. The flapper 68 is made of a magnetic body, and is supported at its portion close to the leg 64a or its central portion by a fulcrum spring 70 to be swingable in directions to come close to or separate from the nozzle 69. The swing-side distal end of the flapper 68 forms a nozzle gap G together with the nozzle 69. A supply pneumatic pressure Psup is supplied to the nozzle 69 from an air supply source (not shown). When the nozzle gap G changes upon a swing motion of the flapper 68, a nozzle back pressure PN also changes. The nozzle back pressure PN is amplified by the pilot relay 56, and is output to the operation unit 22 of the valve 21 as the output pneumatic pressure Pout.

More specifically, the electrical/pneumatic signal converter 48 generates a rotational torque in the flapper 68 with the magnetic flux of the permanent magnet 66 and the magnetic force caused upon energization to the excitation coil 65, so that the gap between the flapper 68 and nozzle 69 is changed, and a pneumatic pressure signal corresponding to a current flowing through the excitation coil 65 can be obtained. The valve positioner 25 itself is known.

The operation of the valve positioner 25 with the above arrangement will be described. When no input signal $I_0$ is supplied, the flapper 68 is held at the initial position where it balances with the magnetic attraction force generated by the permanent magnet 66. At this time, the supply pneumatic pressure Psup is supplied to the nozzle 69 through the pipe 57, while the nozzle back pressure PN is held constant as the flapper 68 does not vibrate. Hence, the output pneumatic pressure Pout of the pilot relay 56 is also constant.

In the ordinary use of the valve 21, the feedback pin 32 of the feedback mechanism 24 is held at the position of solid line (position of θ/2) shown in FIG. 3. In the full-closed state of the valve 21, the feedback pin 32 is held at a position where it has pivoted at the maximum angle counterclockwise (full-closed position). In the full-open state of the valve 21, the feedback pin 32 is held at a position where it has pivoted at the maximum angle clockwise (full-open position).

The input signal $I_0$ (FIG. 2) to the valve positioner 25 changes in the range of 4 mA to 20 mA. When the input signal $I_0$ is 4 mA, the valve 21 is held in the full-closed state. When the input signal $I_0$ is 20 mA, the valve 21 is held in the full-open state. When the valve 21 is in the full-closed state, the feedback pin 32 and feedback shaft 33 are held at the positions of FIG. 3 where they have pivoted at the maximum angle counterclockwise, as described above. In this state, when the excitation coil 65 is energized by a current corresponding to the input signal $I_0$, a counterclockwise rotational torque proportional to the supplied current is generated in the flapper 68 about the fulcrum spring 70 as the center due to the action of the magnetic field, and moves the flapper 68 toward the nozzle 69. Thus, the nozzle gap G decreases and the nozzle back pressure PN increases, and a pneumatic signal proportional to the input signal $I_0$ is generated. This pneumatic signal is amplified by the pilot relay 56, and is output as the output pneumatic pressure Pout, to operate the operation unit 22.

When the operation unit 22 is operated by the output pneumatic pressure Pout, the actuating shaft 23 rotates clockwise in FIG. 3 to open the valve 21. Simultaneously, the feedback pin 32 also pivots together with the actuating shaft 23. Accordingly, the feedback shaft 33 also pivots in the same direction as the feedback pin 32.

At this time, as the feedback shaft 33 pivots clockwise, in the angular range from the full-closed position to the position of θ/2, the distance from the rotary shaft 36 to feedback pin 32 increases gradually. Thus, the second bearing 38 gradually moves backward with respect to the feedback shaft 33. Subsequently, when the feedback shaft 33 further pivots from the position of θ/2 toward the full-open position, the distance from the rotary shaft 36 to feedback pin 32 gradually decreases conversely. Hence, the second bearing 38 gradually moves forward with respect to the feedback shaft 33.

The feedback sensor 34 detects the rotation angle of the rotary shaft 36 at this time, converts it into an electrical signal corresponding to the rotation angle, and inputs it to the control arithmetic unit 47 as a feedback signal $I_1$. The control arithmetic unit 47 compares the input signal $I_0$ and feedback signal $I_1$, and feedback-controls the nozzle flapper mechanism 67 such that the difference between them becomes zero, thus stabilizing the movement of the flapper 68.

Conversely, when returning from the full-open state to the full-closed state, operation opposite to that described above takes place. Hence, the valve 21 can be automatically controlled by the input signal $I_0$.

Figure 8:
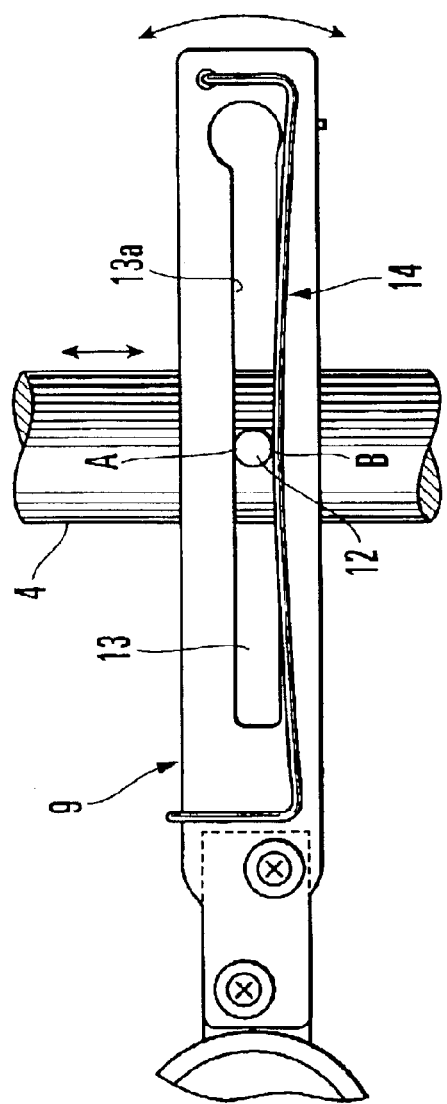
FIG. 8 is a front view of the main part of a feedback mechanism in a conventional valve positioner.

With the feedback mechanism 24 of the valve positioner 25 having the above structure, the feedback pin 32 is held by the cylindrical first bearing 37 to be relatively rotatable, and the feedback shaft 33 is held by the similarly cylindrical second bearing 38 to be relatively slidable in the axial direction. Thus, the feedback pin 32 need not be biased by the conventional pin pressing spring 14 shown in FIG. 8, and loose movement caused by vibration or the like can be prevented.

The first and second bearings 37 and 38 are formed cylindrically. Thus, even if the first and second bearings 37 and 38 are vibrated as the influence of the fluid, the force of vibration acts on them dispersedly in their axial directions, and does not concentrate on one point. Therefore, wear, damage, or the like of the feedback pin 32 and/or feedback shaft 33 can be reduced or prevented. As a result, the reliability and durability of the valve positioner 25 can be improved, and the valve 21 can be controlled at high precision.

The feedback pin 32 and feedback shaft 33 may be connected to each other by only inserting the feedback pin 32 in the first bearing 37 of the connecting member 35 and inserting the feedback shaft 33 in the second bearing 38. The assembling operation is thus easy, and screws and springs to be necessary for assembly become unnecessary, so that the number of components can be reduced.

When assembling the feedback mechanism 24, whether the distal end of the feedback shaft 33 projects from the second bearing 38 can be checked through the space 42 formed in the connector 39 of the connecting member 35. If the distal end of the feedback shaft 33 does not project, the contact area of the feedback shaft 33 and second bearing 38 decreases, and accordingly the force dispersing effect decreases. This also applies to the feedback pin 32 and first bearing 37. Therefore, the first and second bearings 37 and 38 are preferably fabricated such that the feedback pin 32 and feedback shaft 33 project substantially.

Feedback mechanisms according to the second and third embodiments of the present invention will be described with reference to FIGS. 5A and 5B.

Figure 5A:
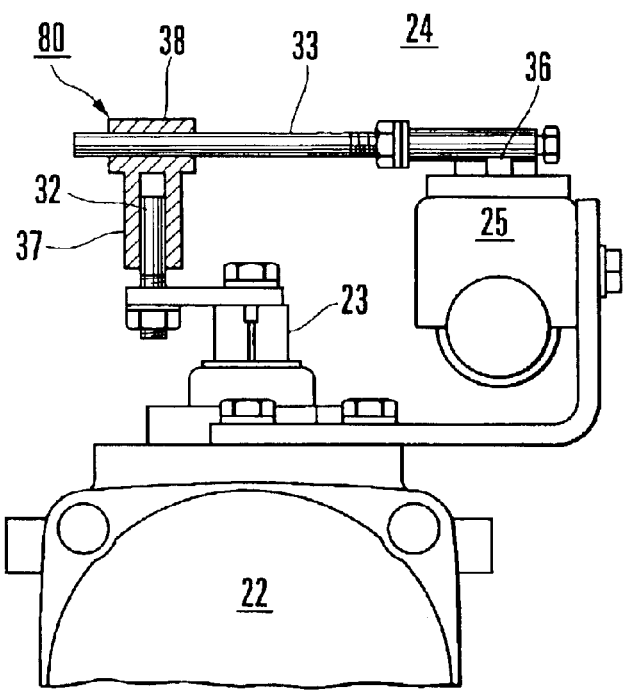
FIGS. 5A and 5B are front views of the main parts of the feedback mechanisms according to the second and third embodiments of the present invention, respectively.

In the embodiment shown in FIG. 5A, a cylindrical first bearing 37 having one open end and a cylindrical second bearing 38 integrally formed on the closed end face of the first bearing 37 and having two open ends make up a connecting member 80. According to this embodiment, the first and second bearings 37 and 38 are connected by directly bonding them to be perpendicular to each other. Thus, the connector 39 shown in FIG. 3 can be omitted. The connecting member 80 is not limited to the bonded body of the first and second bearings 37 and 38, but can be any block member that integrally has the first and second bearings 37 and 38.

Figure 5B:
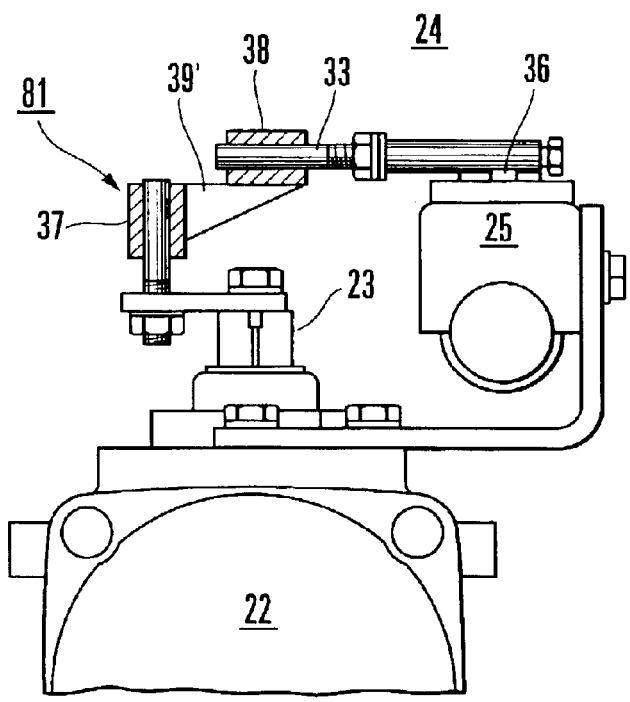

In the embodiment shown in FIG. 5B, a cylindrical first bearing 37 having two open ends, a cylindrical second bearing 38 having two open ends, and a plate-like connector 39' for connecting the first and second bearings 37 and 38 make up a connecting member 81. According to this embodiment, the opening 42 of the connector 39 shown in FIG. 3 can be omitted.

When such connecting member 80 or 81 is used, a feedback pin 32 and feedback shaft 33 can be connected well and operated smoothly in the same manner as in the first embodiment.

Figure 6:
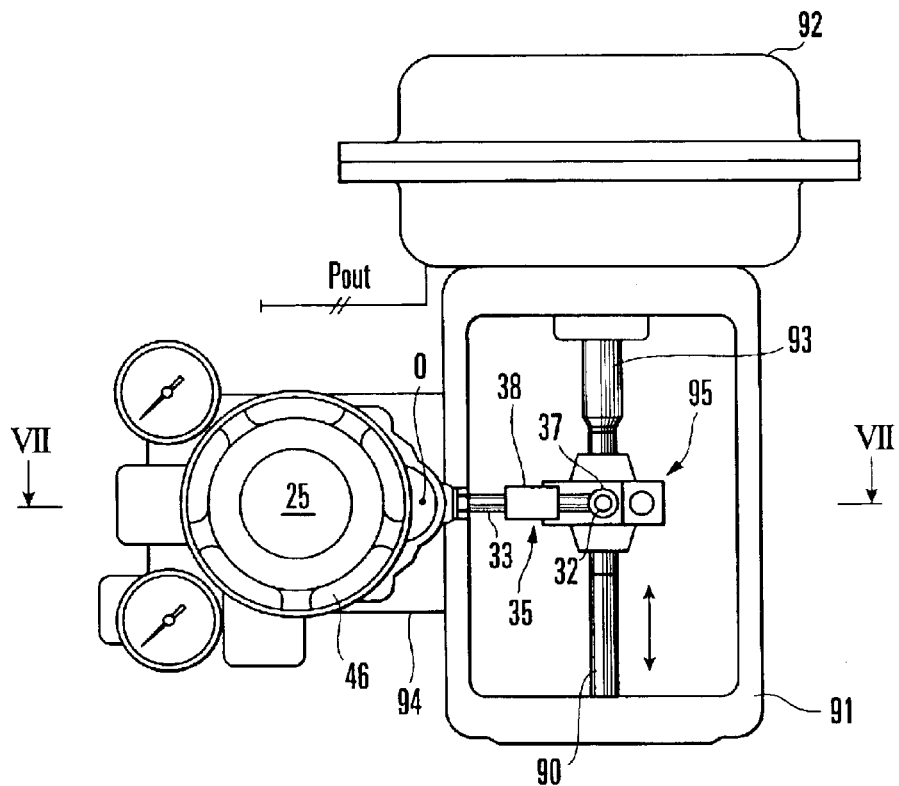
FIG. 6 is a front view of a valve positioner according to the fourth embodiment of the present invention.
Figure 7:
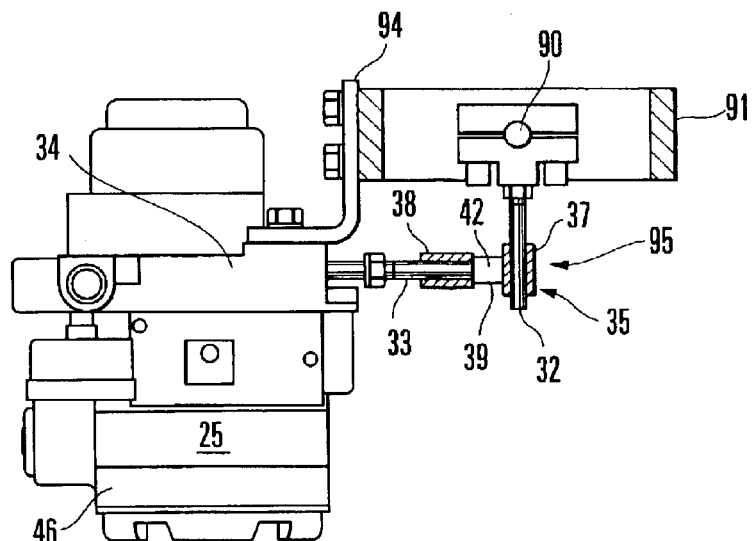
FIG. 7 is a sectional view taken along the line VII—VII of FIG. 6.

A valve positioner according to the fourth embodiment of the present invention will be described with reference to FIGS. 6 and 7. The same reference numerals as in the first embodiment are denoted by the same reference numerals, and a description thereof will be omitted when necessary. This embodiment is applied to a cage type valve (not shown).

The cage type valve has a driving shaft 90. A yoke 91 is fixed to the upper portion of the valve main body. An operation unit 92 vertically and reciprocally moves the driving shaft 90 with a pneumatic pressure Pout through an actuating shaft 93. The driving shaft 90 is coaxially connected to the actuating shaft 93 of the operation unit 92. A feedback pin 32 is horizontally provided to the connecting portion of the actuating shaft 93 and driving shaft 90 perpendicularly to the actuating shaft 93 and driving shaft 90. A valve positioner 25 is fixed to the yoke 91 through a bracket 94. The cage type valve has a feedback mechanism 95.

A feedback shaft 33 of the feedback mechanism 95 is horizontally provided perpendicularly to the feedback pin 32, and is connected to the connecting portion of the actuating shaft 93 and driving shaft 90 through a connecting member 35. The connecting member 35 which connects the feedback pin 32 and feedback shaft 33 has the same arrangement as that of the connecting member 35 shown in FIGS. 3 and 4. More specifically, the connecting member 35 is formed of a first bearing 37 through which the feedback pin 32 is inserted to be relatively rotatable, a second bearing 38 through which the feedback shaft 33 is inserted to be relatively slidable, and a connector 39 for connecting the first and second bearings 37 and 38. The connector 39 has a space 42 through which the distal end of the feedback shaft 33 can be visually checked.

In this arrangement, when the feedback pin 32 vertically moves together with the driving shaft 90, the feedback shaft 33 swings vertically about a fulcrum O as the center. At this time, the swing angle of the feedback shaft 33 is detected by a feedback sensor 34 and is converted into an electrical signal. The feedback sensor 34 is attached in a machine main body 46 of the valve positioner 25 in the same manner as in the first embodiment.

In this embodiment as well, the feedback pin 32 of the driving shaft 90 and the feedback shaft 33 of the feedback sensor 34 are connected to each other through the connecting member 35 having the first and second bearings 37 and 38. Thus, in the same manner as in the embodiments described above, the force caused by the vibration can be dispersed by the first and second bearings 37 and 38, and wear, damage, and the like of the feedback pin 32 and feedback shaft 33 can be prevented reliably.

In the embodiments described above, the feedback sensor 34 is attached in the machine main body 46 of the valve positioner 25. Alternatively, the feedback sensor 34 may be attached outside the valve positioner 25. In this case, the feedback sensor 34 may send an electrical signal corresponding to the rotational angle to a control arithmetic unit 47 in the machine main body 46 of the valve positioner 25 through a cable.

As has been described above, according to the present invention, the feedback pin which moves interlocked with the motion of the actuating shaft of the valve is held by the cylindrical first bearing, and the feedback shaft of the feedback sensor is also held by the cylindrical second bearing. When vibration occurs as the influence of the fluid, the force acting on the feedback pin and feedback shaft can be dispersed by the first and second bearings in their longitudinal directions. Thus, the force will not concentratedly act on one point, and accidents such as wear and damage of the feedback pin and feedback shaft can be reduced or prevented. The actual working amount of the actuating shaft can be detected at high precision, so that the reliability, durability, vibration resistance, and the like of the valve positioner can be improved.

As the feedback pin and feedback shaft need only be held by the first and second bearings, they need not be biased by a spring or the like, resulting in a simple structure.

In the connecting member having a space at its connector that connects the first and second bearings, whether the distal end of the feedback shaft substantially extends through the second bearing can be checked through the space.

What is claimed is:

1. A feedback mechanism comprising:
   a feedback pin which displaces interlocked with a motion of a driving shaft of a valve that opens and closes;
   a feedback shaft which pivots interlocked with displacement of said feedback pin;
   a feedback sensor which outputs a feedback signal, to be used for opening/closing said valve, in accordance with a pivoting amount of said feedback shaft, and
   a connecting member which connects said feedback pin and said feedback shaft, said connecting member having a cylindrical first bearing through which said feedback pin is inserted and a cylindrical second bearing through which said feedback shaft is inserted.

2. A mechanism according to claim 1, wherein
   said first and second bearings are provided perpendicularly to each other,
   said feedback pin is rotatably inserted in said first bearing, and
   said feedback shaft is slidably inserted in said second bearing.

3. A mechanism according to claim 1, wherein said connecting member has a connector for connecting said first and second bearings to each other.

4. A mechanism according to claim 3, wherein said connector has a space through which a distal end of said feedback shaft can be visually checked.

5. A mechanism according to claim 1, wherein said connecting member is formed of a block member integrally having said first and second bearings.

6. A valve positioner including:
   a pilot relay which supplies an output pneumatic pressure in accordance with a supplied pneumatic pressure to an operation unit which opens/closes a valve;
   an electrical/pneumatic signal converter which adjusts an output supply pressure to be supplied from said pilot relay to said operation unit on the basis of a control signal;
   a feedback mechanism which detects an actual working amount of an actuating shaft of said valve and outputs a feedback signal; and
   a control arithmetic unit which controls said electrical/pneumatic signal converter by outputting the control signal such that a difference between the feedback signal from said feedback mechanism and an input signal becomes zero,
   wherein said valve positioner has
      a feedback pin which displaces interlocked with a motion of a driving shaft of said valve that opens and closes;
      a feedback shaft which pivots interlocked with displacement of said feedback pin;
      a feedback sensor which outputs a feedback signal, to be used for opening/closing said valve, in accordance with a pivoting amount of said feedback shaft, and
      a connecting member which connects said feedback pin and said feedback shaft, said connecting member having a cylindrical first bearing through which said feedback pin is inserted and a cylindrical second bearing through which said feedback shaft is inserted.

* * * * *